United States Patent [19]

Sano

[11] Patent Number: 4,676,268
[45] Date of Patent: Jun. 30, 1987

[54] PLASTIC GATE VALVE
[75] Inventor: Nichiro Sano, Nobeoka, Japan
[73] Assignee: Asahi Yukizai Kogyo Co., Ltd., Japan
[21] Appl. No.: 716,703
[22] Filed: Mar. 27, 1985
[30] Foreign Application Priority Data Apr. 20, 1984 [JP] Japan .............................. 59-57334[U]

[51] Int. Cl.$^4$ ................................................ F16L 7/00
[52] U.S. Cl. .................................... 137/375; 137/556; 251/266; 251/368
[58] Field of Search ................ 137/375, 556; 251/368, 251/266

[56] References Cited

U.S. PATENT DOCUMENTS

| 1,947,257 | 2/1934 | Fritz et al. | 251/368 |
| 2,194,264 | 3/1940 | Abercrombie et al. | 251/266 |
| 2,202,735 | 5/1940 | Johnson | 137/375 |
| 2,859,932 | 11/1958 | Mackal | 251/368 |
| 3,217,735 | 11/1965 | Statler | 251/266 |
| 3,595,523 | 7/1971 | Felton | 251/368 |
| 3,738,383 | 6/1973 | David | 137/375 |
| 3,778,028 | 12/1973 | Graves et al. | 137/375 |
| 4,025,050 | 5/1977 | Manki et al. | 251/368 |
| 4,213,480 | 7/1980 | Orum et al. | 137/556 |
| 4,348,006 | 9/1982 | Schmitt et al. | 251/366 |

FOREIGN PATENT DOCUMENTS

| 58-36682 | 3/1983 | Japan . | |
| 2073374 | 10/1981 | United Kingdom | 251/266 |

Primary Examiner—A. Michael Chambers
Attorney, Agent, or Firm—Burns, Doane, Swecker & Mathis

[57] ABSTRACT

A plastic gate valve including a plastic valve casing having a passage and a valve chamber therein; a spindle extending in the valve chamber and rotatably supported by the valve casing; a handle connected with the spindle and rotating it; and a plastic valve body engaged with the spindle and moving along an inner wall of the valve chamber in response to the rotation of the spindle whereby the valve body opens and shuts the passage. The valve body is made of heat-resistant rigid vinyl chloride resin and covered with rubber-like elastic material by means of vulcanization adhesion so as to be integral with the valve body.

10 Claims, 3 Drawing Figures ent requires special, expensive adhesives and various treatment of the valve body to ensure sufficient interfacial adhesive strength. Without the same, the rubber-like elastic material often peels off due to the liquid pressure, clogging the passage. Also, when the gate valve is opened, biased expansion of the rubber-like material occurs due to the liquid pressure. Further, peeling of the rubber-like elastic material from the valve body occurs due to the frictional resistance between the valve body and the valve seat of the valve casing. As a result, the sealing effect in the gate valve is decreased.

PLASTIC GATE VALVE

BACKGROUND OF THE INVENTION

(1) Field of the Invention

The present invention relates to a plastic gate valve mainly used in a large-diameter passage of liquid transport piping for liquid such as slurry.

(2) Description of the Related Art

A gate valve is known which opens and shuts a passage by moving a cylindrical or plate-shaped valve body in a valve casing for control of a flow of liquid. The gate valve is generally made of metal or plastic. When the gate valve is used in liquid transport piping for liquid such as slurry, the valve body of the gate valve is covered with an elastic material such as rubber.

If the gate valve is made of metal, the valve body is generally covered with a rubber-like elastic material by vulcanization adhesion. This is satisfactory in itself, but there are other problems with metal valves, such as rust mixing into the liquid and greater heaviness than plastic.

If the gate valve is made of plastic, such as rigid polyvinyl chloride, there is no problem with rust or heaviness, but the plastic cannot be heated to the temperature for vulcanization adhesion so it is difficult to cover the valve body with a rubber-like elastic material so as to be integral with the valve body. This means the rubber-like elastic material must be adhered to the plastic valve body by an adhesive. Thus, method of affixment requires special, expensive adhesives and various treatment of the valve body to ensure sufficient interfacial adhesive strength. Without the same, the rubber-like elastic material often peels off due to the liquid pressure, clogging the passage. Also, when the gate valve is opened, biased expansion of the rubber-like material occurs due to the liquid pressure. Further, peeling of the rubber-like elastic material from the valve body occurs due to the frictional resistance between the valve body and the valve seat of the valve casing. As a result, the sealing effect in the gate valve is decreased.

Some improved plastic gate valves are available in which the plastic valve body is covered with metal by adhesion and the metal is covered with the rubber-like elastic material by vulcanization adhesion. However, in this type of valve body construction, the adhesion between the metal and plastic is insufficient. If a large impact is applied to the materials, they easily separate. Also, rust makes it impossible to use the above gate valve for a long time as the rust will mix into the liquid and the metal will corrode to an usable state.

SUMMARY OF THE INVENTION

The object of the present invention is to provide a plastic gate valve having a high sealing effect able to withstand long usage. Another object of the present invention is to provide a plastic gate valve with a valve body covered by rubber-like elastic material substantially adhered integrally thereto.

Still another object of the present invention is to provide a plastic gate valve with a valve body given the required strength and elasticity and prevented from peeling of the rubber-like elastic material due to frictional resistance and impact.

According to the present invention, there is provided a plastic gate valve including a plastic valve casing having therein a passage and a valve chamber which extends in a direction perpendicular to a longitudinal axis of the passage, a spindle extending in the valve chamber and rotatably supported by the valve casing, a handle connected with the spindle and rotating it, and a plastic valve body engaged with the spindle and moving along an inner wall of the valve chamber in response to the rotation of the spindle whereby the valve body opens and shuts the passage. The valve body is made of heat-resistant rigid vinyl chloride resin and covered with rubber-like elastic material by means of vulcanization adhesion so as to be integral with the valve body.

According to a preferred embodiment, the heat-resistant rigid vinyl chloride resin constituting the valve body is a chlorinated polyvinyl chloride resin composition having a heat distortion resistance temperature not less than 100° C. The valve body includes a hollow body. The hollow body is spherically shaped at the bottom thereof, having a small hole communicating with the inside thereof at the lower end and having an annular groove around the upper end thereof. The upper and lower parts of the rubber-like elastic material are fit into the annular groove and the small hole, respectively. Further, the rubber-like elastic material preferably consists of sytrene-butadiene rubber, acrylonitrile-butadiene rubber, chloroprene rubber, acrylate rubber, or ethylene-propylene terpolymer. The shore hardness of the rubber-like elastic material is from 60 to 75.

DESCRIPTION OF THE PREFERRED EMBODIMENT

Preferred embodiments of the present invention will be described with reference to the accompanying drawings.

Figure 1:
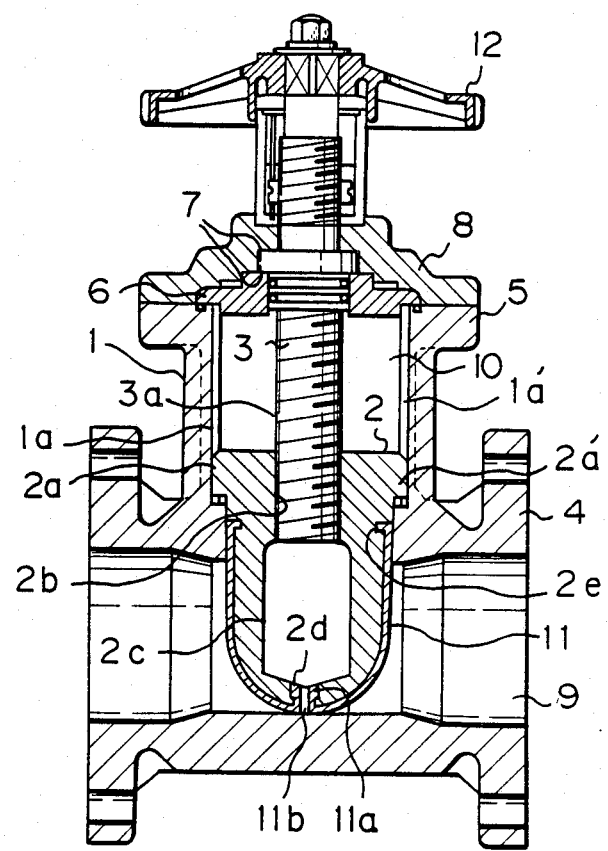
FIG. 1 is a longitudinal sectional view of a first embodiment of the present invention.

In FIG. 1, a valve casing represented by numeral 1 is made of rigid plastic such as vinyl chloride resin or vinylidene fluoride resin. The valve casing 1 has a passage 9 and a valve chamber 10 extending in a direction perpendicular to a longitudinal axis of the passage 9 (upward and downward in FIG. 1).

On both ends in an axial direction of the passage 9 and around an opening in an upper end of the valve chamber 10, flange portions 4 and 5 are formed, respectively. A cover 8 is fit on the flange portion 5 with a spindle support 6 and a thrust ring 7 therebetween. The cover B is fixed to the valve casing 1 by bolts and nuts (not shown).

A valve body 2 is made of heat-resistant rigid vinyl chloride resin, which is covered by rubber-like elastic material 11 such as styrene-butadiene rubber made integral therewith by vulcanization adhesion. The heat-resistant rigid vinyl chloride resin is chlorinated polyvinyl chloride resin composition of "Type IV Grade 1" provided in ASTM D-1784, which has heat distortion resistance temperature not less than 100° C.

The upper end of the valve body 2 is provided with projections 2a and 2a', which slidably engage with guide grooves 1a and 1a' of the valve casing 1 so as to prevent the valve body from rotation thereof and to allow the valve body only to move up and down. The bottom of the valve body 2, i.e., the lower end of the valve body 2, is spherically shaped. The diameter of the valve body 2 increases toward the top end thereof. The taper ratio is preferably about from 1/10 to 1/5. The base end of the valve body 2, i.e., the upper end of the valve body 2 is provided with an internal thread 2b at the center thereof, a hollow portion 2c leading to the internal thread 2b is formed thereunder. The internal thread 2b is screwed on an external thread 3a of a spindle 3 extending in the valve chamber 10.

Figure 2:
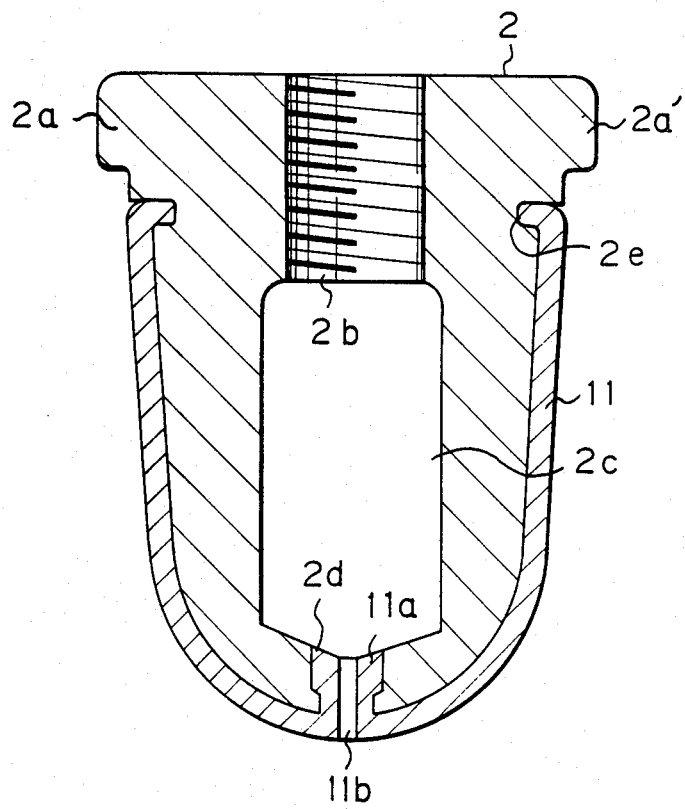
FIG. 2 is an enlarged longitudinal sectional view of a valve body in FIG. 1.

As shown more clearly in FIG. 2, the center portion of the bottom of the valve body 2 is provided with a small hole 2d communicating with the hollow portion 2c of the valve body 2 and having an internal diameter less than that of the hollow portion 2c. The upper portion of the outer surface of the valve body 2 is provided with an annular fitting groove 2e. The small hole 2d and groove 2e are not always necessary, but they are preferably provided in order to strengthen the integration with the valve body 2 and rubber-like elastic material 11 adhered thereto.

The rubber-like elastic material 11 covers the valve body 2 and is integral therewith, as shown in FIG. 2. As the rubber-like elastic rubber, styrene-butadiene rubber, acrylonitrile-butadiene rubber, chloroprene rubber, acrylate rubber, ethylenepropylene terpolymer, etc. are used. The above materials have shore hardnesses of from about 60 to 75. The rubber-like elastic material 11 is also fit in the small hole 2d and the groove 2e in addition to the outer surface of the valve body 2 and adhered on the valve body 2 by vulcanization, so that the rubber-like elastic material 11 is inscribed on a valve seat of the valve casing 1 when the valve body 2 shuts the passage 9. In the center of a projecting portion 11a of the rubber-like elastic material 11, which is fit in the small hole 2d, there is provided a small through hole 11b having a diameter from 4 mm to 8 mm and communicating with the hollow portion 2c of the valve body 2.

Since the passage 9 communicates with the hollow portion 2c through the small hole 11b, solid particles and foreign substances in the liquid which have collected in the hollow portion 2c and the screwing portion 2b with the spindle 3 escape into the passage 9 through the small hole 11b. Thus, the screw engagement with the valve body 2 and the spindle 3 is kept smooth, and almost no wear of the threaded portions arises. Therefore, the opening and shutting operation of the valve body can be achieved easily, and the sealing effect of the gate valve can be kept for a long time.

Vulcanization adhesion between the valve body 2 and the rubber-like elastic material 11 is achieved by molding the rubber-like elastic material 11 around the valve body 2 and adhering both integrally at a temperature not less than 100° and under pressure for a certain time. The interfacial adhesive strength between the valve body 2 and the rubber-like elastic material 11 amounts to more than 10 kgf/cm. The two pieces are securely and integrally adhered with each other, so that the valve body 2 can sufficiently withsand long usage. The above-mentioned interfacial adhesive strength represents the tensile load required to draw apart the rubber-like material of a width of 1 cm from the surface of the valve body. The rubber-like elastic material 11 covers the valve body 2 with uniform thickness according to the configuration of the valve body. Although the thickness of the rubber-like elastic material is not especially limited, it is preferably from 2 mm to 6 mm.

The spindle 3 has an external thread portion 3a. Extending in the valve chamber 10, the external thread portion 3a is screwed on the internal thread portion 2b of the valve body 2. The spindle 3 is supported so as to be able to rotate in relation to the valve casing 1 through the spindle support 6 and so as not to move in a direction of the axis of the spindle 3. Thus, when a handle 12 fixed to the upper end of the spindle 3 is rotated, only the valve body 2 is moved upward and downward.

Figure 3:
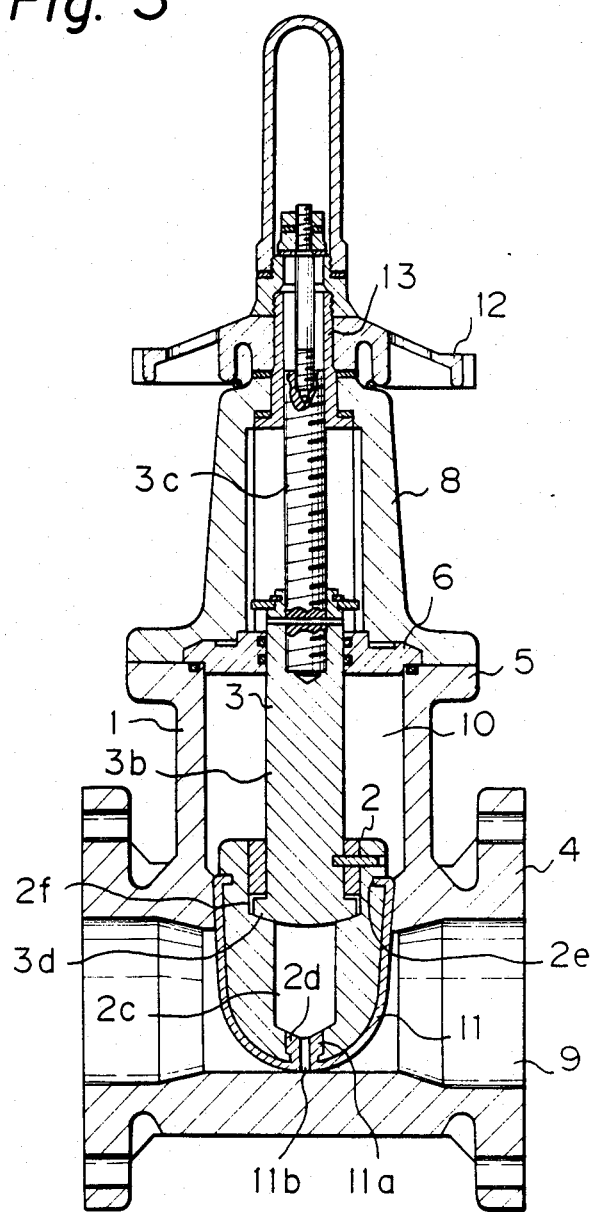
FIG. 3 is a longitudinal sectional view of a second embodiment of the present invention.

FIG. 3 shows the second embodiment of the present invention.

This embodiment is different from the first embodiment in that the spindle 3 includes a lower first spindle 3b made of plastic and an upper second spindle 3c made of metal. A flange 3d formed at the lower end of the first spindle 3b is stably fit in a groove 2f of the valve body 2. The second spindle 3c is provided with an external thread portion. The external thread portion is screwed on the handle 12 through a sleeve 13.

In this embodiment, the spindle 3 is moved upward and downward in accordance with the rotation of the handle 12. Consequently, the valve body 2 connected to the lower end of the spindle 3 also moves upward and downward and opens the passage 9. Regarding the adhesive and integral construction between the valve body 2 and rubber-like elastic material 11, it is never different from the first embodiment.

The present invention is not limited to use for slurry liquid, but also can be used for gas containing powder particles and the like.

According to the present invention, since the rubber-like elastic material is securely adhered to the valve body made of the heat-resistant rigid vinyl chloride resin by vulcanization adhesion, and the rubber-like elastic material is substantially integral with the valve body, the valve body has the flexibility of the rubber-like elastic material as well as strength in itself. Accordingly, if the valve body is subjected to high liquid pressure when the gate valve is shut, the rubber-like elastic material is prevented from biasing toward the circumferential direction and prevented from damage by shearing force acting on the expanding portion which occurs in accordance with biasing of the rubber-like elastic material. Thus, the rubber-like elastic material cannot be peeled from the valve body. Therefore, the opening and shutting operation of the valve body can be always achieved at a lower torque in a steady condition.

In the plastic gate valve according to the present invention, there is no problem of metal corrosion as with a metal valve body or a plastic valve body partially made of metal, thus this gate valve can be used for a long time in a steady condition.

Further, since the sealing surface in this gate valve is completely sealed in accordance with the follow-up action of the rubber-like elastic material, this gate valve exhibits a marked sealing effect, especially in liquid containing slurry, not to speak of normal liquid.

Also, since the rubber-like elastic material and the valve seat surface of the valve casing are subject to little wear, the sealing effect is kept for a long time.

Furthermore, if the bottom structure of the valve body is spherically shaped as in the above embodiment, the liquid flows along the curved surface and creation of a turbulent flow is decreased.

I claim:
1. A plastic gate valve comprising:
   a plastic valve casing having therein a passage and a valve chamber which extends in a direction perpendicular to a longitudinal axis of said passage;

a spindle extending in said valve chamber and rotatably supported by said valve casing;

a handle connected with said spindle and rotating it; and an integral valve body engaged with said spindle and moving along an inner wall of said valve chamber in response to the rotation of said spindle whereby said valve body opens and shuts said passage;

said integral valve body comprising a core made of heat-resistant rigid vinyl chloride resin, a covering of rubber-like elastic material and a vulcanized bond between said core and said covering along opposing surfaces of said core and said covering so as to define said integral valve body;

said integral valve body including a cavity, said integral valve body being spherically shaped at a bottom portion thereof, said core having wall means defining a passage extending from said cavity through a lower end of said core, said covering including a projecting portion extending into said core passage and covering said core passage wall means, said covering provided with a hole at said projecting portion, said hole communicating said cavity with an exterior of said covering.

2. The plastic gate valve according to claim 1, wherein said heat-resistant rigid vinyl chloride resin of said valve body core is a chlorinated polyvinyl chloride resin composition having a heat distortion resistance temperature not less than 100° C.

3. The plastic gate valve according to claim 2, wherein said core has an annular groove around the upper end thereof, said vulcanized bond and an upper portion of said covering being coextensive with said annular groove.

4. The plastic gate valve according to claim 2, wherein said rubber-like elastic material is selected from a group consisting of styrene-butadiene rubber, acrylonitrile-butadiene rubber, chloroprene rubber, acrylate rubber, and ethylene-propylene terpolymer.

5. The plastic gate valve according to claim 2, wherein said rubber-like elastic material has a shore hardness from 60 to 75.

6. The plastic gate valve according to claim 2, wherein said spindle comprises a lower first spindle and an upper second spindle, said first spindle being made of plastic and connected to the integral valve body at a lower end of said lower spindle, said second spindle being made of metal and provided with an external thread, said external thread being screwed on the handle through a sleeve.

7. The plastic gate valve according to claim 1, wherein said core has an annular groove around the upper end thereof, said vulcanized bond and an upper portion of said covering being coextensive with said annular groove.

8. The plastic gate valve according to claim 1, wherein said rubber-like elastic material is selected from the group consisting of styrene-butadiene rubber, acrylonitrile-butadiene rubber, chloroprene rubber, acrylate rubber, and ethylene-propylene terpolymer.

9. The plastic gate valve according to claim 1, wherein said rubber-like elastic material has a shore hardness from 60 to 75.

10. The plastic gate valve according to claim 1, wherein said spindle comprises a lower first spindle and an upper second spindle, said first spindle being made of plastic and connected to the integral valve body at a lower end of said lower spindle, said second spindle being made of metal and provided with an external thread, said external thread being screwed on the handle through a sleeve.

* * * * *